US008239395B2

(12) United States Patent
Fruchter et al.

(10) Patent No.: US 8,239,395 B2
(45) Date of Patent: Aug. 7, 2012

(54) STORAGE DEVICE PRESENTING TO HOSTS ONLY FILES COMPATIBLE WITH A DEFINED HOST CAPABILITY

(75) Inventors: Ari Daniel Fruchter, Ramat Aviv (IL); Judah Gamliel Hahn, Ofra (IL); Donald Ray Bryant-Rich, Haifa (IL); Daniel Isaac Goodman, Beit Shemesh (IL)

(73) Assignee: Sandisk IL Ltd., Kfar Saba (IL)

( * ) Notice: Subject to any disclaimer, the term of this patent is extended or adjusted under 35 U.S.C. 154(b) by 649 days.

(21) Appl. No.: 12/344,373

(22) Filed: Dec. 26, 2008

(65) Prior Publication Data

US 2010/0169393 A1 Jul. 1, 2010

(51) Int. Cl.
*G06F 7/00* (2006.01)
*G06F 17/30* (2006.01)

(52) U.S. Cl. ......................... 707/757; 707/758; 707/828

(58) Field of Classification Search ........................ None
See application file for complete search history.

(56) References Cited

U.S. PATENT DOCUMENTS

| | | | | |
|---|---|---|---|---|
| 5,931,947 | A | 8/1999 | Burns et al. | |
| 6,377,958 | B1 | 4/2002 | Orcutt | |
| 6,405,315 | B1 | 6/2002 | Burns et al. | |
| 6,438,705 | B1 | 8/2002 | Chao et al. | |
| 6,925,545 | B2 | 8/2005 | March et al. | |
| 7,073,010 | B2 | 7/2006 | Chen et al. | |
| 7,184,264 | B2 | 2/2007 | Le | |
| 7,210,043 | B2 | 4/2007 | Miyazaki et al. | |
| 7,272,606 | B2 | 9/2007 | Borthakur et al. | |
| 7,272,613 | B2 | 9/2007 | Sim et al. | |
| 7,512,979 | B1 * | 3/2009 | Koike et al. | 726/23 |
| 7,778,972 | B1 | 8/2010 | Cormie et al. | |
| 7,870,282 | B2 | 1/2011 | Jonsson et al. | |
| 7,975,270 | B2 | 7/2011 | Ferri et al. | |
| 8,015,584 | B2 | 9/2011 | Breen et al. | |
| 2003/0180032 | A1 | 9/2003 | Barde et al. | |

(Continued)

FOREIGN PATENT DOCUMENTS

EP 1536427 A1 6/2005

(Continued)

OTHER PUBLICATIONS

"Ext2 Installable File System for Windows", www.fs-driver.org, printed Dec. 23, 2008, 6 pages.

(Continued)

*Primary Examiner* — Alicia Lewis
(74) *Attorney, Agent, or Firm* — Toler Law Group, PC

(57) ABSTRACT

A method includes defining a host capability; creating for a storage device a second directory tree from a first directory tree of the storage device that is included in a file system within the storage device; and, for a data file that is stored in the storage device and is selectable for consumption by a host through the first directory tree that is included in the storage device's file system, determining whether the data file requires for consumption a host having the defined host capability. If the data file requires a host having the defined host capability, an entry is created in the second directory tree in which the data file is not selectable for consumption by the host. Otherwise, an entry is created in the second directory tree in which the data file is selectable for consumption by the host.

21 Claims, 9 Drawing Sheets

U.S. PATENT DOCUMENTS

| | | | |
|---|---|---|---|
| 2004/0133650 | A1 | 7/2004 | Miloushev et al. |
| 2004/0133797 | A1 | 7/2004 | Arnold |
| 2004/0252967 | A1 | 12/2004 | Sheu et al. |
| 2005/0005044 | A1 | 1/2005 | Liu et al. |
| 2005/0033721 | A1 * | 2/2005 | Cromer et al. .................... 707/1 |
| 2006/0064476 | A1 * | 3/2006 | Decasper et al. ............. 709/223 |
| 2006/0101259 | A1 | 5/2006 | Chen |
| 2006/0107317 | A1 * | 5/2006 | Moran et al. .................... 726/21 |
| 2006/0161754 | A1 * | 7/2006 | Dewey et al. ................. 711/170 |
| 2007/0027873 | A1 | 2/2007 | Factor et al. |
| 2007/0050620 | A1 | 3/2007 | Pham et al. |
| 2007/0073747 | A1 | 3/2007 | Jung et al. |
| 2007/0156842 | A1 | 7/2007 | Vermeulen et al. |
| 2007/0159528 | A1 | 7/2007 | Kikuchi et al. |
| 2007/0233957 | A1 | 10/2007 | Lev-Ran et al. |
| 2007/0247551 | A1 | 10/2007 | Raines |
| 2007/0250193 | A1 | 10/2007 | Raines et al. |
| 2007/0283094 | A1 | 12/2007 | Narayanaswami et al. |
| 2008/0005531 | A1 | 1/2008 | Praca |
| 2008/0034440 | A1 | 2/2008 | Holtzman et al. |
| 2008/0059743 | A1 | 3/2008 | Bychkov et al. |
| 2008/0098023 | A1 | 4/2008 | Araki et al. |
| 2008/0154921 | A1 | 6/2008 | Bauchot et al. |
| 2008/0163339 | A1 | 7/2008 | Janakiraman et al. |
| 2008/0215744 | A1 | 9/2008 | Shenfield |
| 2008/0297656 | A1 | 12/2008 | Saito |
| 2009/0300710 | A1 | 12/2009 | Chai et al. |
| 2010/0017546 | A1 * | 1/2010 | Poo et al. ........................ 710/32 |
| 2010/0122332 | A1 | 5/2010 | Kamei et al. |
| 2010/0183277 | A1 | 7/2010 | Okada et al. |

FOREIGN PATENT DOCUMENTS

| | | | |
|---|---|---|---|
| EP | 1586988 | A2 | 10/2005 |
| EP | 1650665 | A1 | 4/2006 |
| EP | 1998270 | A1 | 12/2008 |
| WO | 2007099012 | A1 | 9/2007 |

OTHER PUBLICATIONS

Altaparmakov, Anton et al. "SfR Fresh"—the SfR Freeware/Shareware Archive, www.sfr-fresh.com, printed Dec. 23, 2008, copyright 2000-2005, 65 pages (See lines 964-966 on p. 26).

International Search Report and Written Opinion received in corresponding PCT Application No. PCT/US2009/062602 from the International Searching Authority (EPO) mailed Jan. 27, 2010, 12 pages.

Rich, Donald. "Authentication in Transient Storage Device Attachments," IEEE Computer Society, vol. 40, No. 4, dated Apr. 2007, pp. 102-104.

Meter et al. "Derived Virtual Devices: A Secure Distributed File System Mechanism," In Proceedings of the Fifth Nasa Goddard Space Flight Center Conference on Mass Storage Systems and Technologies, 1996, Citeseer, 20 pages.

Jansen et al. "Smart Cards and Mobile Device Authentication: An Overview and Implementation," National Institute of Standards and Technology (NIST), NISTIR 7206, dated Jul. 2005, 52 pages.

International Search Report and Written Opinion for International Application No. PCT/US2009/063269 received from the International Searching Authority (EPO), dated Jan. 27, 2010, 14 pages.

International Search Report and Written Opinion for International Application No. PCT/US2009/062530 received from the International Searching Authority (EPO), dated Feb. 3, 2010, 13 pages.

International Search Report and Written Opinion for International Application No. PCT/US2009/063260 received from the International Searching Authority (EPO), dated Feb. 11, 2010, 15 pages.

Requirement for Restriction/Election for U.S. Appl. No. 12/344,389 received from the United States Patent and Trademark Office (USPTO), dated Jan. 6, 2011, 5 pages.

Non-Final Office Action for U.S. Appl. No. 12/344,389 received from the United States Patent and Trademark Office (USPTO), dated Feb. 8, 2011, 8 pages.

Final Office Action for U.S. Appl. No. 12/344,389 received from the United States Patent and Trademark Office (USPTO), dated Jul. 19, 2011, 11 pages.

Non-Final Office Action for U.S. Appl. No. 12/344,401 received from the United States Patent and Trademark Office (USPTO), dated Jun. 20, 2011, 11 pages.

Non-Final Office Action for U.S. Appl. No. 12/344,407 received from the United States Patent and Trademark Office (USPTO), dated Feb. 11, 2011, 21 pages.

Notice of Allowance and Fees Due for U.S. Appl. No. 12/344,407 received from the United States Patent and Trademark Office (USPTO), dated Jul. 20, 2011, 9 pages.

Non-Final Office Action for U.S. Appl. No. 12/344,389 received from the United States Patent and Trademark Office (USPTO), dated Dec. 16, 2011, 9 pages.

Final Office Action for U.S. Appl. No. 12/344,401 received from the United States Patent and Trademark Office (USPTO), dated Dec. 1, 2011, 12 pages.

Notice of Allowance and Fees Due for U.S. Appl. No. 12/344,407 received from the United States Patent and Trademark Office (USPTO), dated Nov. 23, 2011, 11 pages.

* cited by examiner

900

| File name | Ext. | Att. | Resvd | Create Date/ Time | Last access date | First cluster (high word) | Last modified Date/ Time | First Cluster (low word) | Size |
|---|---|---|---|---|---|---|---|---|---|
| 8 | 3 | 1 | 1 | 5 | 2 | 2 | 4 | 2 | 4 |
| MYMOVIE | AVI | 20 | | | | 0400 | | 1544 | 14DC9380 |
| LOWRES | AVI | 22 | | | | 0000 | | 9410 | 0A6E49C0 |

| File name | Extension | Attributes | First cluster (high word) | First cluster (low word) | Size |
|---|---|---|---|---|---|
| MYMOVIE | AVI | 22 | 0400 | 1544 | 14DC9380 |

| File name | Extension | Attributes | First cluster (high Word) | First cluster (low word) | Size |
|---|---|---|---|---|---|
| MYMOVIE | AVI | 20 | 0000 | 9410 | 0A6E49C0 |
| LOWRES | AVI | 22 | 0400 | 1544 | 14DC9380 |

| File name | Extension | Attributes | First cluster (high word) | First cluster (low word) | Size |
|---|---|---|---|---|---|
| <E5>DONTUSE | AVI | 20 | 0400 | 1544 | 14DC9380 |

| File name | Extension | Attributes | First cluster (high word) | First cluster (low word) | Size |
|---|---|---|---|---|---|
| MYMOVIE | NOP | 20 | 0400 | 1544 | 14DC9380 |

STORAGE DEVICE PRESENTING TO HOSTS ONLY FILES COMPATIBLE WITH A DEFINED HOST CAPABILITY

CROSS REFERENCE TO RELATED APPLICATIONS

This patent application is related to and incorporates by reference the patent applications entitled "DEVICE AND METHOD FOR FILTERING A FILE SYSTEM" ( U.S. patent application Ser. No. 12/344,389), "A STORAGE DEVICE MANAGING PLAYABLE CONTENT" ( U.S. patent application Ser. No. 12/344,401) and "METHOD AND APPARATUS FOR PROVIDING ACCESS TO FILES BASED ON USER IDENTITY" (U.S. patent application Ser. No. 12/344,407), and in that each share a common inventor (Yehuda Hahn) and were all filed on the same day.

FIELD OF THE INVENTION

The present invention generally relates to presentation of storage device's file system to a host and more specifically to a method and device for presenting a storage device's file system to a host based on a capability of the host.

BACKGROUND

Use of non-volatile based storage devices has been rapidly increasing over the years because they are portable and they have small physical size and large storage capacity. Storage devices come in a variety of designs. Some storage devices are regarded as "embedded", meaning that they cannot, and are not intended to be removed by a user from a host device with which they operate. Other storage devices are removable, which means that the user can move them from one host device to another, or replace a storage device with another.

One type of removable storage devices is commonly known as "Disk-on-Key" devices that are provided with a Universal Serial Bus ("USB") interface in order to allow them to be connected to a computer system, for example. A flash storage device that is provided with a USB interface is also known in the field as a USB Flash Drive, or "UFD". MultiMedia Card ("MMC"), Secure Digital ("SD"), miniSD, and microSD, are exemplary flash storage devices that are used with a variety of host devices such as multimedia players (e.g., MP3 and MP4 players), digital cameras, computer laptops, Global Positioning System ("GPS") devices, and so on.

Home video playback devices, for example, DVD players, set-top boxes, Digital Picture Frames, PVRs, and high-definition players, allow playing back video content. Home video playback devices often come with USB ports to which USB flash drives and portable hard drives can be attached for the purpose of playing media content that was previously acquired, for example, from a home computer, camcorder, or the Internet.

Low-cost DVD players typically are optimized for playback of standard-definition media content at a fixed bit rate. Because of cost considerations, low-end USB-equipped DVD players generally cannot read media content at a high bit rate. Usually, these players support only USB 2.0 full speed (rather than high speed) and may read data at an even lower bit rate. Currently, the leading chipset for DVD players is capable of reading data at 3 megabits per second (Mbps). Users acquiring media content may attempt to use their low-end media players to play back higher-bit-rate files. This will lead to an unpleasant experience of data read stalls, errors in rendering video streams, and de-synchronization. Some current DVD player devices attempt to deal with this issue by notifying the user that the requested file is not supported if the detected bit rate is considerably higher than the supported bit rate. However, this solution does not work well with variable-bit-rate files or with files having multiple segments, and in any event this is a suboptimal solution.

FIG. 1 shows a typical storage device 100. Storage device 100 typically includes a storage area 110 for storing data, a storage controller 120 that manages storage area 110 via data and control lines 130 and communicates with host device 140 via host interface 150. Storage area 110 may be of a NAND flash variety.

Storage controller 120 controls all of the data transfer to/from storage area 110 and data transfer to/from host device 140 by controlling, for example, "read", "write" and "erase" operations, wear leveling, and so on, and by controlling communication with host 140. Storage area 110 may contain; e.g., user and other types of files, protected data that is allowed to be used only by authorized host devices, and security data that is used internally, by storage controller 120. Hosts (e.g., host 140) cannot directly access storage area 110. That is, if, for example, host 140 asks for, or needs, data from storage device 100, host 140 has to request it from storage controller 120. In order to facilitate easy access to data files that are stored in storage device 100, storage device 100 is provided with a file system 160.

Briefly, a file system implements a methodology for storing and organizing computer files. A file system includes a set of abstract data types and metadata that are implemented for the storage, hierarchical organization, manipulation, navigation, access, and retrieval of data. The abstract data types and metadata form "directory trees" through which the computer files (also referred to herein as "data files", or "files" for simplicity) can be accessed, manipulated and launched. A "directory tree" typically includes a root directory and sub-directories. A directory tree is stored in the file system as a "directory file". The set of metadata and directory files included in a file system is called herein a "file system structure". A file system, therefore, includes data files and a file system structure that facilitate accessing, manipulating and launching the data files. FAT32 ("FAT" stands for "File Allocation Table") is an exemplary file system with which storage device 100 can be provided.

File system 160 includes the files stored in storage device 100 and also directory files that contain information related to directory trees through which the stored data files can be accessed and selected for consumption by a host such as host 140. By way of example, a directory file 170 is stored in storage area 110 of storage device 100, through which storage controller 120, or an end-user, can navigate to find data files in file system 160.

Currently, media files can be divided into groups such as "high-speed" files and "full-speed" files. A high-speed file requires for consumption a host that can play back files at a bit rate that can be as high as 480 Mbps. A full-speed file currently requires for consumption a host that can play back files at a maximum bit rate that is 12 Mbps. Some of the data files that are stored in storage device 100 may be playable on "high-speed" and "full-speed" hosts whereas other data files may be playable only on "high-speed" hosts. For example, if host 140 is a high-speed host, it can play back data files that are playable on high-speed hosts, and usually also data files that are playable on low-speed and on full-speed hosts. However, if host 140 is a full-speed host attempting to play back a data file that requires for consumption a high-speed host would result in storage controller 120 streaming the data file to host 140 in a non-optimal bit rate that would degrade the experience of an end-user.

There is therefore a need to address these varying attributes of files and host devices in a way that would make them useful. For example, there is a need to allow playback of various files regardless of whether the storage device has one playback capability or another.

SUMMARY

It would, therefore, be beneficial to allow a storage device to present to a user only files that can be played back by the host with which the storage device operates, regardless of whether the storage device has one playback capability or another. Various embodiments are designed to implement such capability, examples of which are provided herein. The following exemplary embodiments and aspects thereof are described and illustrated in conjunction with systems, tools, and methods, which are meant to be exemplary and illustrative but not limiting in scope.

According to the present disclosure, data files stored in a storage device are identified and classified as either playable on full-speed hosts or unplayable on full-speed hosts. Data files that are classified as playable on full-speed hosts are referenced by a first directory tree (which is referred to herein as the "native directory tree" and the "original directory tree") of the storage device when the storage device is interfaced with a full-speed host, whereas data files that are classified as unplayable on full-speed hosts (e.g., because of them being high-speed files) are referenced (i.e., when a high-speed host is used) by a second directory tree (which is referred to herein as the "modified directory tree" and as the "copy" of the native directory tree) in which the unplayable data files are non-selectable for consumption by the host, for example by being marked as hidden files, by changing metadata pertinent to the these files, such as renaming these file, by not including these files in the second directory tree, and so on.

A method is provided for creating a view of a storage device's file system for hosts of varying capabilities. The storage device may be, for example, a USB flash drive, a SD card, and the like. The method includes defining a host capability; creating for the storage device a second directory tree from a first directory tree of the storage device; and, for a data file that is stored in the storage device and is selectable for consumption by a first host through the first directory tree that is included in the storage device's file system, determining whether the data file requires for consumption a host having the defined host capability. If the data file requires for consumption a host having the defined host capability, an entry is created in the second directory tree in which the data file is not selectable for consumption by the first host. Otherwise (i.e., the data file does not require the defined host capability), an entry is created in the second directory tree in which the data file is selectable for consumption by the first host. A data file may be made non-selectable for consumption, for example, by hiding the data file in the second directory tree, altering a specified address of a first memory sector or a specified address of a first memory cluster of the data file, altering the filename of the data file, altering the file type of the data file, and so on. Hiding a data file in the second directory tree may be implemented, for example, by altering a file attribute of the data file, or in another way.

Creating the second directory tree from the first directory tree may include reading the first directory tree from the storage device; creating an administrative file for accommodating a second (i.e., an alternative) directory tree that is intended to be used only by hosts that have the defined host capability; reading from the first directory tree one or more directory elements from a directory entry that correspond to the data file; and writing the directory entry into the administrative file, wherein at least one of the directory elements of this entry is modified before, during, or after such writing.

The method may further include a step of allocating a storage space in the original file system of the storage device for the administrative file, and another step of using the allocated storage space to create therein an entry for the administrative file, via which the administrative file would be accessible for the purpose of creating the second directory tree.

Determining whether a data file requires the host capability may include, or may be subsequent to, actual reading of the data file by a second host, which may be a personal computer ("PC"). The defined host capability may be, for example, a communication bandwidth, a file format, a specified bit rate for playing back data files, a USB high-speed connection, etc.

A method is provided for presenting a view of a file system of a storage device to a host. The method includes determining, by a storage device, whether a host has a defined capability and using (i.e., referencing) a first directory tree of the storage device to present a view of the file system of the storage device to the host if the host has the defined capability, or, if the host does not have the defined capability, using i.e., referencing a second directory tree to present a modified view of the file system of the storage device to the host in which a first data file not requiring the defined capability would be selectable for consumption by the host and a second data file requiring the defined capability would not be selectable for consumption by the host.

According to the present disclosure the second directory tree is a copy of the first directory tree, which copy of the first directory tree includes at least an entry from the first directory tree that corresponds to the second data file and that was altered or modified.

Using the second directory tree may include accessing an administrative file in the storage device that contains at least an entry from the first directory tree that corresponds to the second data file and that was altered.

According to the present disclosure determining whether the host has the defined capability may include, or may be subsequent to, examination of parameters that are exchanged during a handshake between the host and the storage device, or it may include, or may be subsequent to, examination of data that are received from a signaling interface (e.g., a push button) that is operatively connected to the storage device.

A storage device is also provided, which includes a non-volatile memory that has stored therein a data file that requires for consumption a host having a defined host capability, a first directory tree through which the data file is selectable for consumption by the host having the defined host capability and by a host not having the defined host capability, and a second directory tree through which the data file is selectable for consumption only by the host having the defined host capability. The second directory tree may include at least an entry from the first directory tree that corresponds to the data file and that was altered.

The storage device also includes a controller that is adapted to determine whether the host has the defined capability. The controller is further adapted to present to the host a view of a file system of the storage device by referencing the first directory tree if the host has the defined capability or a modified view of the file system of the storage device by referencing the second directory tree if the host does not have the defined capability.

The controller may reference the second directory tree by accessing an administrative file in the storage device that contains an entry from the first directory tree that corresponds to the data file and that was altered. The administrative file may be referenced by an entry in the first directory tree.

The storage device may include, or have associated with it, a signaling interface that is operatively connected to the controller, and the controller may be operative to determine whether the host has the defined capability by examining data received from the signaling interface, or by examining parameters exchanged during a handshake with the host with which the storage device operates.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which:

FIG. 9 is an example "native" or original (i.e., unmodified) directory table before modification; and FIGS. 10A through 10D show modifications of the directory table of FIG. 9 according to example embodiments.

Figure 1:
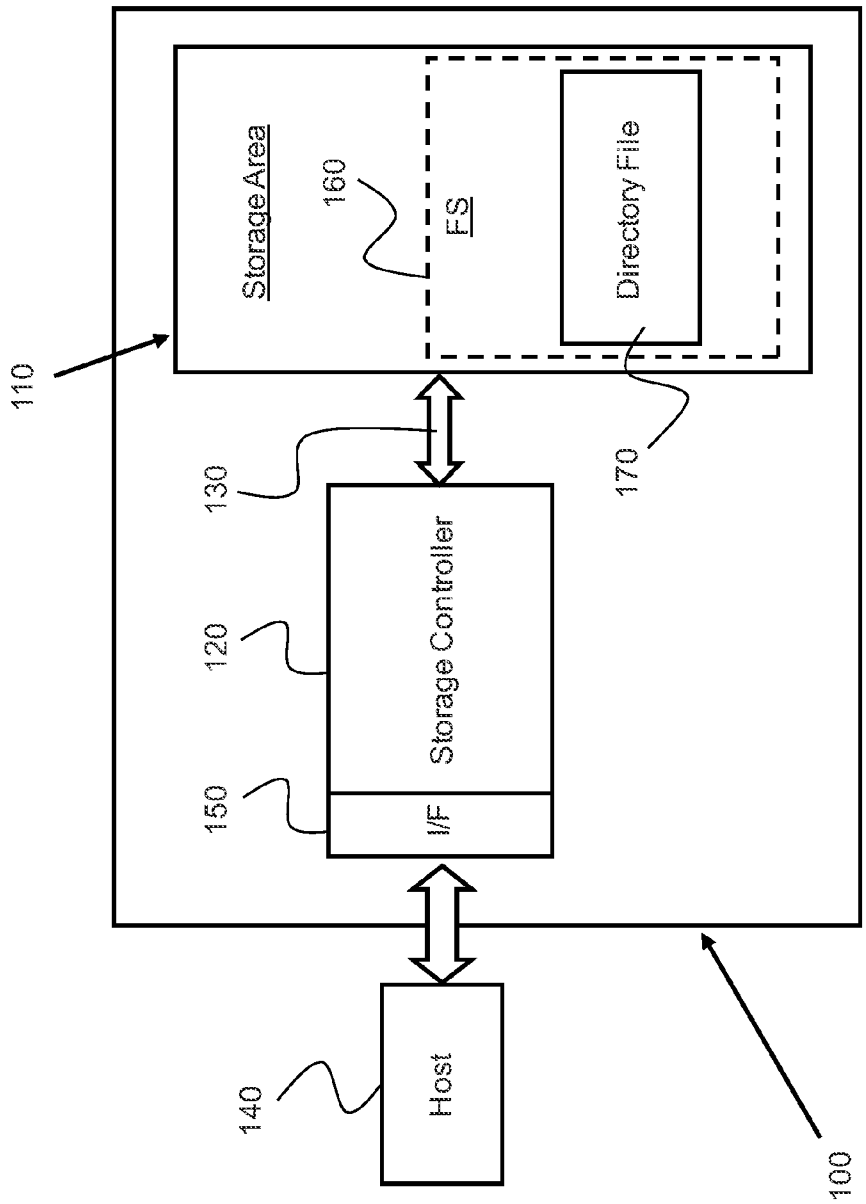
FIG. 1 is a block diagram of a portable storage device according to related art.

It will be appreciated that for simplicity and clarity of illustration, elements shown in the figures are not necessarily drawn to scale. Further, where considered appropriate, reference numerals may be repeated among the figures to indicate like, corresponding or analogous elements.

DETAILED DESCRIPTION

The description that follows provides various details of example embodiments. However, this description is not intended to limit the scope of the claims but instead to explain various principles of the invention and the manner of practicing it.

Figure 2:
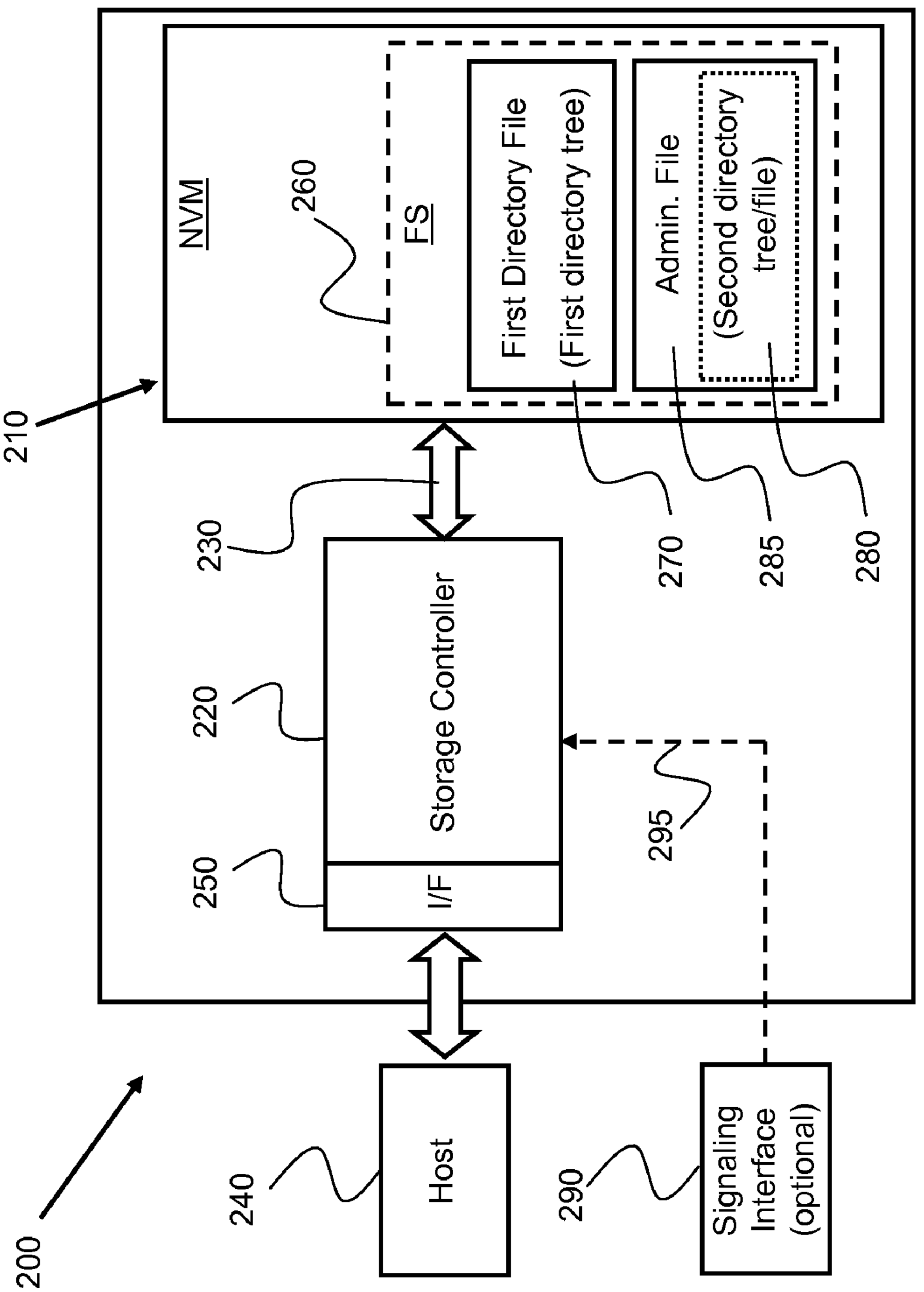
FIG. 2 is a block diagram of a portable storage device according to an example embodiment.

FIG. 2 is a block diagram 200 of a portable storage device according to an example embodiment. Storage device 200 includes a storage area 210, which may be a non-volatile memory of a NAND flash variety, for storing data. Storage area 210 may have stored therein a data file that requires for consumption a host having a defined capability, a first directory tree through which the data file is selectable for consumption by the host, and a second directory tree through which the data file is not selectable for consumption by the host. Storage area 210 may also contain user and other types of files, protected data that is allowed to be used only by authorized host devices, and security data that is used internally by storage controller 220.

Storage device 200 also includes a storage controller 220 (referred to herein as the "controller", for short) that manages storage area 210 via data and control lines 230 and communicates with a host device 240 via host interface 250. Storage controller 220 controls all the data transfer to/from storage area 210 and data transfer to/from host device 240 by controlling, for example, "read", "write" and "erase" operations, wear leveling, and so on.

Controller 220 is adapted or configured to determine whether host 240 has the defined capability and to act as follows depending on the determination result. Controller 220 presents a view of the file system of storage device 200 to host 240 by referencing first directory tree 270 if host 240 has the defined capability, while controller 220 presents a modified view of the file system of storage device 200 to host 240 by referencing second directory tree 280, the second directory tree being a modified version of first directory tree 270, if host 240 does not have the defined capability. By "referencing a second directory tree" is meant that when certain logical sector addresses are requested by a host, they are remapped or redirected such that the file system presented to the host appears to include the second directory tree rather than the first directory tree. Controller 220 may reference second directory tree 280 by accessing an administrative file 285 that is located in storage device 200. Storage controller 220 may initially allocate a storage space in file system 260 of storage device 200 for the administrative file 285, and use the allocated storage space to create, for administrative file 285, an entry in the file system 260. The storage space for the administrative file can be allocated in the first directory tree of the storage device. Administrative file 280 may contain at least one entry from first directory tree 270 that corresponds to the data file and that has been altered to hide the data file or to make it non-selectable for consumption in any other way, such as by renaming the data file or not including it in the second directory tree.

Host 240 cannot directly access storage area 210. That is, if, for example, host 240 asks for, or needs, data from storage device 200, host 240 has to request it from storage controller 220. In order to facilitate easy access to data files that are stored in storage device 200, storage devices 200 is provided with a file system 260. File system 260 may be, for example, FAT32. File system 260 includes data files and a file system structure that enables accessing, manipulating and launching the data files. The file system structure may include, among other things, directory files that contain information pertaining to, or information that represents, directory trees through which the stored data files can be accessed and selected for consumption by a host such as host 240. For example, a directory file 270, which is stored in file system 260, represents, or is related to, a first directory tree through which storage controller 220, or an end-user, can navigate to find data files in file system 260.

As explained in connection with FIG. 1, some of the data files that are included in file system 260 may be playable on "high-speed" and "full-speed" hosts, whereas other data files may be playable only on "high-speed" hosts. In order to guarantee a designated playback quality for various types of playable data files, it is imperative that each data file be allowed to be played back only by a host having at least the designated playback quality. By "a host having at least the designated playback quality" is meant a host having the designated playback quality or a playback quality that is better then the designated playback quality.

Referring again to FIG. 2, if host 240 is a high-speed host, it can play back data files that are playable on high-speed hosts, and usually also data files that are playable on low-speed and full-speed hosts. However, if host 240 is a full-speed host, then attempting to play back, by host 240, a data file that requires for consumption a high-speed host will result in storage controller 220 streaming the data file to host 240 in a non-optimal bit rate that will degrade the user experience of the end-user.

The first directory tree, which is represented by first directory file 270 (the first directory tree being also referred to herein as the "native directory tree" or as the "original directory tree" of storage device 200) allows data files to be accessed and selected for consumption by a host regardless of the host capability; that is, regardless of whether the host has the capability required to guarantee a designated or required playback quality to the data file. As explained above in connection with FIG. 1, playing back a data file on an unsuitable host may result in a degraded performance and poor user experience.

In order to avoid the problem of playing back data files on unsuitable hosts, a playback quality level is defined (the playback quality level being referred to herein as a "defined host capability", or "defined capability" for short), which discriminates between hosts that have the designated playback quality level and hosts that do not have the designated playback quality level. After having a playback quality level defined, a decision is made as to which of the playable files, which are stored in file system 260, require for consumption a host that can provide the designated playback quality level and which files don't. Files that require for consumption a host that provides the designated playback quality level will not be selectable for consumption by hosts that cannot provide the designated playback quality level, thereby avoiding poor end-user experience with regard to this type of files, which are referred to herein as "incompatible data files". Files that can settle for a lower playback quality level (which files are referred to herein as "compatible data files") will continue to be selectable for consumption by both types of hosts; namely, by hosts that can provide the designated playback quality level and by hosts that cannot provide the designated playback quality level. Compatible files will be permitted to be selectable for consumption by both types of hosts because it is assumed that a data file that can be played back on a low-end host with an acceptable playback quality can also be played back on a higher grade host with at least the same playback quality.

In order to implement the files discrimination methodology described herein, storage device 200 is provided with an administrative file 280. Administrative file 280 is part of, or included in, file system 260 but it can be stored somewhere else in storage device 200, or it can be independent therefrom. Administrative file 285 includes a second directory tree 280 through which compatible data files are selectable as before, but in which the incompatible data files are "hidden" from the end-user of the storage device so that the end-user cannot launch them.

A "hidden file" or "hidden directory" on a computer is a file, or directory (folder), that is not shown to the user. Hidden directories are most often used to hide important operating system-related files. Items (i.e., files and directories) can be made hidden or visible by toggling a hidden attribute that is associated with an item. Such hiding mechanism may be used, in the context of the present disclosure, to hide data files that should not be permitted to be consumed (e.g., played back) by hosts that do not have a defined host capability. For example, the hiding mechanism may be used to hide high-speed files (i.e., file that require for consumption a high-speed host) from full-speed hosts because full-speed hosts are unsuitable to play back fast-speed files. Hiding a data file may be effected by altering a file attribute of the data file, and making, or rendering, a data file non-selectable may be effected by any of: (i) hiding the file in the second directory tree, (ii) altering a file attribute of the data file, (iii) altering a specified address of a first memory sector or a specified address of a first memory cluster of the data file, (iv) altering the filename of the data file, and (v) altering the file type of the data file.

Storage device 200 may determine whether the host has a defined capability, and what that capability is, by examining parameters that are exchanged during the handshake between the host and the storage device, or examining data that are received from a signaling interface 290 operatively connected to the storage device. The signaling interface may be, for example, a push button. In other words, an end-user may use signaling interface 290 to transfer 295 a message or an indication to storage controller 220 that host 240 has the defined capability. Storage device 200 may be a Secure Digital ("SD") card, USB storage drive, USB flash drive ("UFD"), or the like, and the defined host capability may be any of: (i) a communication bandwidth, (ii) a file format, (iii) for playing back data files at a specified bit rate, (iv) a USB high-speed connection, and (v) a USB high-speed connection.

Being the original directory tree in the storage device, the first directory tree allows hosts to access files in the storage device regardless of whether the hosts have the defined capability or not. Therefore, no capability determination needs to be made in respect of hosts if only the first directory exists. The question whether a host has the defined capability is relevant only after the second directory is stored in the storage device and a host is connected to the storage device, in which case the storage device checks upon the host capability and presents to the connected host a view of the storage device's file system that matches its capability.

Figure 3:
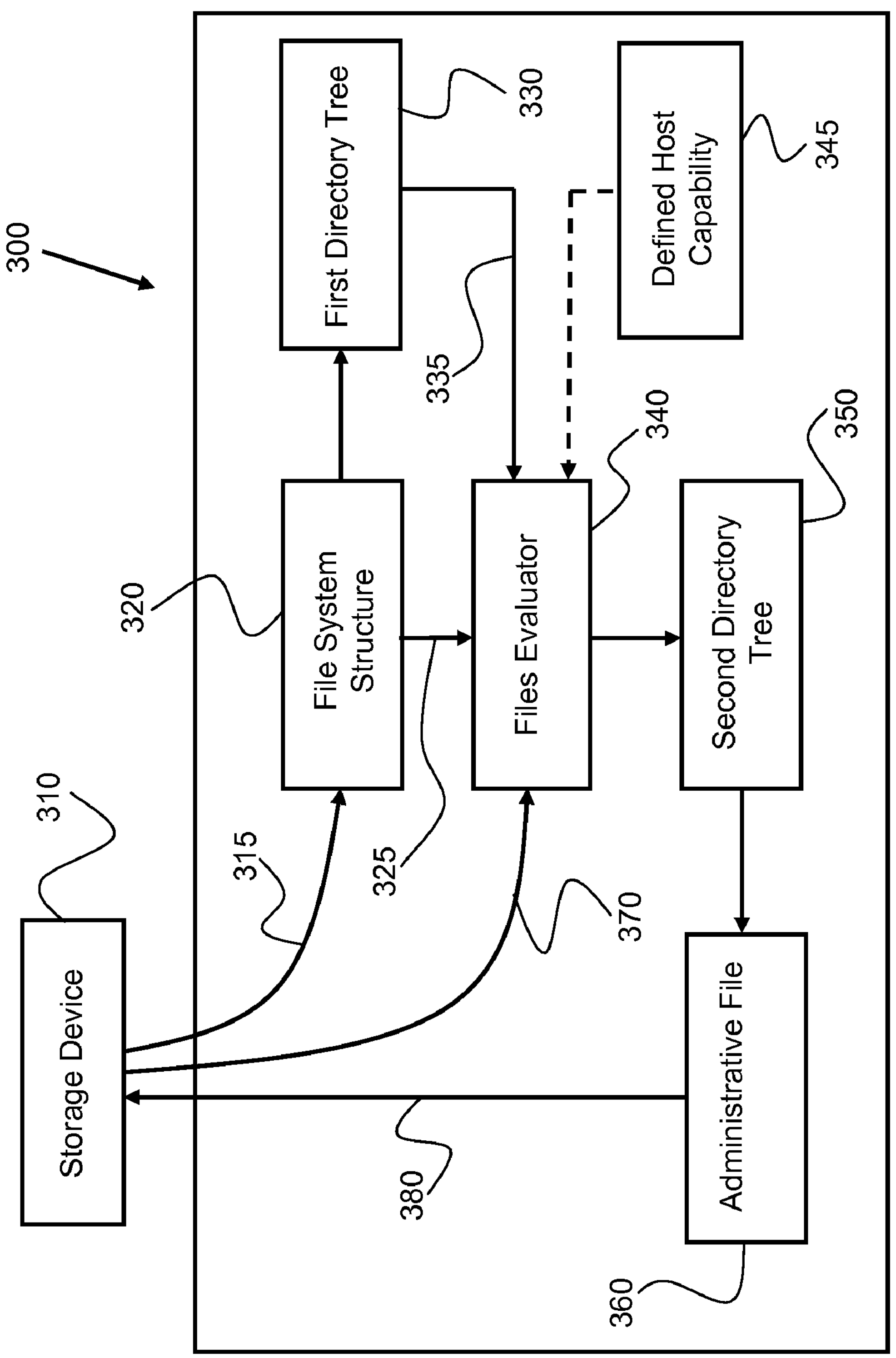
FIG. 3 is a method for creating a view of a file system for hosts of varying capabilities according to an example embodiment.

FIG. 3 shows a host 300 creating an administrative file for a storage device 310 according to one example embodiment. An initial step in creating an administrative file such as administrative file 285 of FIG. 2 is operatively interfacing storage device 310 with host 300, which may be, for example, a personal computer ("PC"). Then, host 300 reads 315 from storage device 310 the original (i.e., native) file system structure 320 of storage device 310, and temporarily stores the original file system structure 320. Host 300 then retrieves, from file system structure 320, the original, or native, directory tree 330 (i.e., the "first directory tree) through which files can be selected (i.e., accessed, evaluated, manipulated and launched) for consumption by host 300 or by another device, for example, by a digital camera.

Files evaluator 340, which may be an application that runs on host 300, may evaluate or examine files, one file at a time, that are stored in storage device 310. Files evaluator 340 may evaluate or examine the files by reading 370 the files, and/or information that is pertinent to the files, from storage device 310. Files evaluator 340 may read the files from storage device 310 by using 335 first directory tree 330 and, if required, by reading 325 information or metadata from file system structure 320 which are pertinent to the evaluated files. By "evaluating (or examining) a file" is meant assessing the playback quality level (e.g., bit rate) that is required to play back the file without compromising the playback quality, and, based on the playback quality level assessment, determining whether or not the file can be played back on a host having a defined host capability 345.

If files evaluator 340 determines that a currently evaluated file is a compatible file, that is, the file can be played back equally well by hosts that can provide the designated playback quality level and by hosts that cannot provide the designated playback quality level, files evaluator 340 may prepare a new entry for the evaluated file whereby the file is identified, or made or rendered selectable for consumption by both types of hosts. In other words, files evaluator 340 may create a new directory entry for the evaluated file, which is a copy of the directory entry of the evaluated file in the first directory tree 330.

However, if files evaluator 340 determines that the currently evaluated file is an incompatible file, that is, the file cannot be played back well by hosts that do not provide the designated playback level (i.e., the file cannot be played back by hosts that do not have the defined host capability), files evaluator 340 prepares an alternative (i.e., modified) directory entry for the evaluated file whereby the file is identified, or made or rendered not selectable for consumption by such hosts. Determining whether the file can be consumed by hosts not having the host capability may include, or it may be subsequent to, reading the file by host 300 (host 300 may be referred to as a "second host", the "first host" being the host that consumes, that is plays back, files it reads from the storage device).

After files evaluator 340 completes the evaluation of all the playable files, files evaluator 340 creates a second directory tree 350 that includes all the new directory entries, some of which are exact copies of corresponding directory entries in first directory tree 330, and the remainder of which are modified copies of the corresponding directory entries in first directory tree 330. A modified copy of a directory entry includes at least one directory element that has been altered or modified relative to a corresponding directory element in first directory tree 330 but may otherwise be identical to the corresponding directory element in first directory tree 330. By "directory element" is meant a record in a file system structure that represents a single unique file extent, or the beginning of a chain of extents, wherein the record includes identifying attributes for the file contained in the extent(s) and the structure is part of a tree of such structures that, together, comprise a complete representation of the contents of a file system. Then, files evaluator 340 writes the second directory tree 350 into administrative file 360. Alternatively, files evaluator 340 writes unmodified and modified directory entries into administrative file 360, one entry at a time, as the files are evaluated one after another, instead of waiting until every file is evaluated and then writing the directory entries into administrative file 360.

Finally, after administrative file 360 is compiled it is forwarded 380 to, and stored in, storage device 310. Hence, each playable file in storage device 310 that does not require a host having the defined host capability can be referenced via a first directory tree and via a second directory tree, though only one of the two directory trees will be usable by a host, depending on whether the host has a defined capability or not, as described, for example, in connection with FIG. 6. If files evaluator 340 does not find in storage device 310 files that require for consumption a host having the defined host capability there is no point in sending administrative file 360 to, and storing administrative file 360 in, storage device 310 because in this case the files in storage device 310 can be presented to various types of hosts "normally", by using the storage device's original (i.e., first) directory tree, which means that, under these circumstances, a second directory tree is not required.

Figure 4:
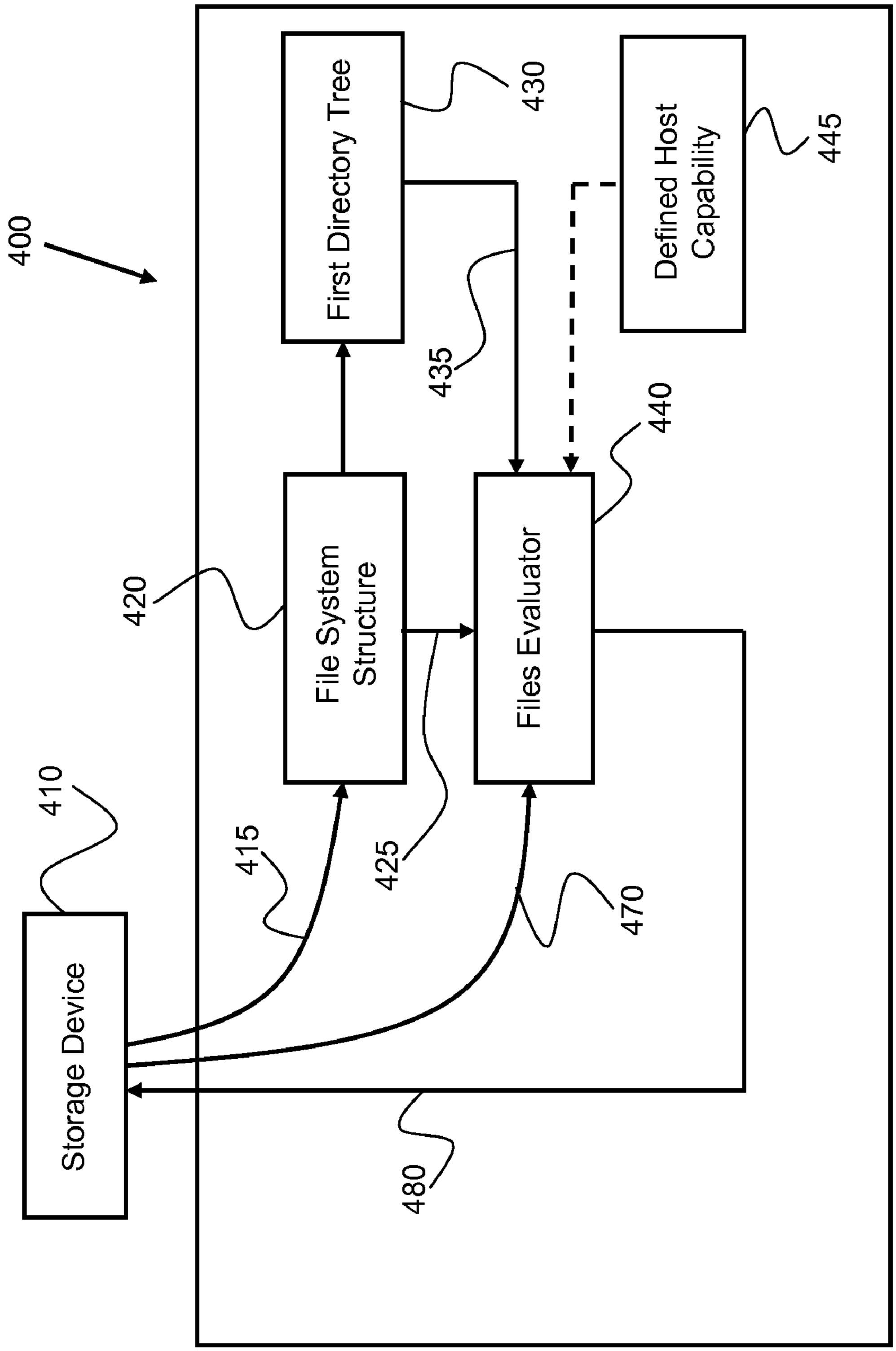
FIG. 4 is a method for creating a view of a file system for hosts of varying capabilities according to an example embodiment.

FIG. 4 shows a host 400 creating an administrative file for a storage device 410 according to another example embodiment. An initial step in creating an administrative file such as administrative file 285 of FIG. 2 is operatively interfacing storage device 410 with host 400, which may be, for example, a PC. Then, host 400 reads 415 from storage device 410 the original (i.e., native) file system structure of storage device 410 and temporarily stores 420 the read file system structure of storage device 410. Host 400, then, retrieves from file system structure 420 the original, or native, directory tree 430 (referred to herein as the "first directory tree") through which files, which are stored in storage device 410, can be selected (i.e., accessed, evaluated, manipulated and launched) for consumption by host 400 or by another device, for example, a digital camera.

Files evaluator 440, which may be an application that runs on host 400, evaluates files that are stored in storage device 410, one file at a time. Files evaluator 440 may evaluate or examine a file that is stored in storage device 410 by playing back 470 the file from storage device 410, or by reading information that pertains to the file to be evaluated. Files evaluator 440 accesses the file to be evaluated by using 435 first directory tree 430 and, if required, by using 425 information or metadata from, or information or metadata that are derived from, file system structure 420 that are pertinent to, or associated with, the file being evaluated. A file can be evaluated, for example, by assessing its playback quality level and determining whether or not it can be played back on a host having a defined host capability 445.

In evaluating a file, files evaluator 440 determines whether a file requires a particular playback quality level of a host. If the file can be played back equally well by hosts that can provide the designated playback quality level (i.e., hosts that have a defined host capability) and by hosts that cannot provide the designated playback quality level (i.e., hosts that do not have the defined host capability) then files evaluator 440 creates a new directory entry for the evaluated file (by copying the original directory entry of the evaluated file from first directory tree 430) whereby the compatible file is made or rendered selectable for consumption by hosts that have the defined host capability and by hosts that do not have the defined host capability. However, if files evaluator 440 determines that the currently evaluated file is an incompatible file, that is, the file requires a designated playback quality level and cannot be played back well by hosts that do not provide such designated playback quality level (i.e., the file cannot be played back well by hosts that do not have the required host capability, these hosts being referred to herein as "low-end hosts"), files evaluator 440 creates an alternative, modified, directory entry for the evaluated file whereby the file is made or rendered not selectable for consumption. Creating an alternative directory entry for an evaluated file is exemplified, for example, in FIGS. 10A through 10D, which are described below.

Regardless of whether files evaluator 440 copies an original directory entry from first directory tree 430 or creates a modified directory entry, files evaluator 440 writes 480 modified and copied directory entries, one directory entry at a time, as the files are evaluated one file after another, or all at once at the end, into an administrative file (not shown in FIG. 4) for which storage space was allocated in storage device 410 beforehand. This way the administrative file allocated in storage device 410 is "filled" with one directory entry after another and with necessary information or metadata that collectively (i.e., the directory entries and the related information or metadata) create or form a second directory tree (not shown in FIG. 4).

Depending on the type of the file system used by the storage device, metadata may also need to be updated if the second directory tree is used. For example, in FAT32, the FAT chains that represent each directory file must be terminated with an End-Of-File ("EOF") entry. Briefly, a "chain" in a FAT file system is a linked list of clusters (where a "cluster" is one or more sequential sectors) that, when followed, details the addresses of every component in the file. The FAT is an array of cluster addresses, and each array element holds the address of the next cluster. The first cluster in the chain is indicated by the directory entry, and the last cluster array element is indicated by an EOF entry.

An administrative file associated with the first tree is allocated as a single chain, and the chain must be substituted with shorter chains for each directory in the second tree by remapping the relevant FAT sectors to sectors stored within the administrative file itself. Regarding a file system known as "New Technology File System" ("NTFS"), the volume bitmap does not include chain length information for each extent. Briefly, a "volume bitmap" (which is stored in a $Bitmap metafile) is a bit array representing all of the cluster addresses in an NTFS volume, where a "1" bit indicates that the cluster is allocated, and a "0" bit indicates that the cluster is free. This allows the file system to rapidly allocate additional extents as needed, but does not give information as to the sequence of the file extents as FAT would. Thus, it does not need to be updated, since the clusters are still allocated even in the second directory tree.

Figure 5:
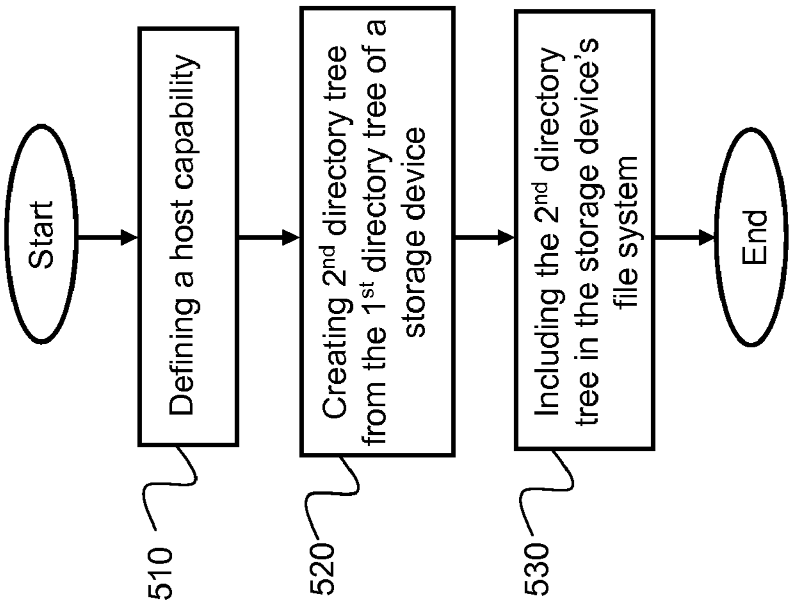
FIG. 5 is a method for presenting digital content to a host according to an example embodiment.

FIG. 5 shows a method for creating a view of a file system for hosts of varying capabilities according to an example embodiment. At step 510 a host capability is defined in order for it to be used as a criterion to classify a data file either as a file that requires for consumption a host that has the defined host capability, or as a file that does not require such a host.

After reading the file system structure of the storage device the original (i.e., the first or native) directory tree of the storage device is retrieved from the file system structure and, at step 520 a second directory tree is created from the first directory tree. The second directory tree may include one or more entries in which data files are selectable for consumption by hosts regardless of whether or not they have the defined host capability, and one or more entries in which data files are selectable for consumption only by hosts that have the defined host capability.

In order to create the second directory tree each data file that is stored in the file system of the storage device is evaluated or examined and a determination is made whether the data file requires, or does not require, the defined host capability in order for it to be consumed (e.g., played back) by a host. A data file requires a defined host capability if the data file cannot be consumed unless the host possesses the defined capability. For example, assuming that the defined host capability is a host capability to play back low-speed files, if a data file cannot be consumed by low-speed hosts (for example because the data file is meant to be consumed by high-speed hosts), then that data file would be regarded as a data file that requires for consumption a host that has the defined host capability, and such a data file would be regarded as an "incompatible data file" because it is incompatible with hosts that do not have the defined host capability.

If a determination is made that the evaluated or examined data file requires for consumption a host that has the defined host capability, then an entry is added to the second directory tree, such that the data file is not selectable for consumption by the first host. However, if a determination is made that the evaluated or examined data file does not require for consumption a host that has the defined host capability, then an entry is added to the second directory tree, such that the data file is selectable for consumption by the first host. At step 530 the second directory tree is included in the file system of the storage device, for example by being included in an administrative file that may reside in the storage device.

Figure 6:
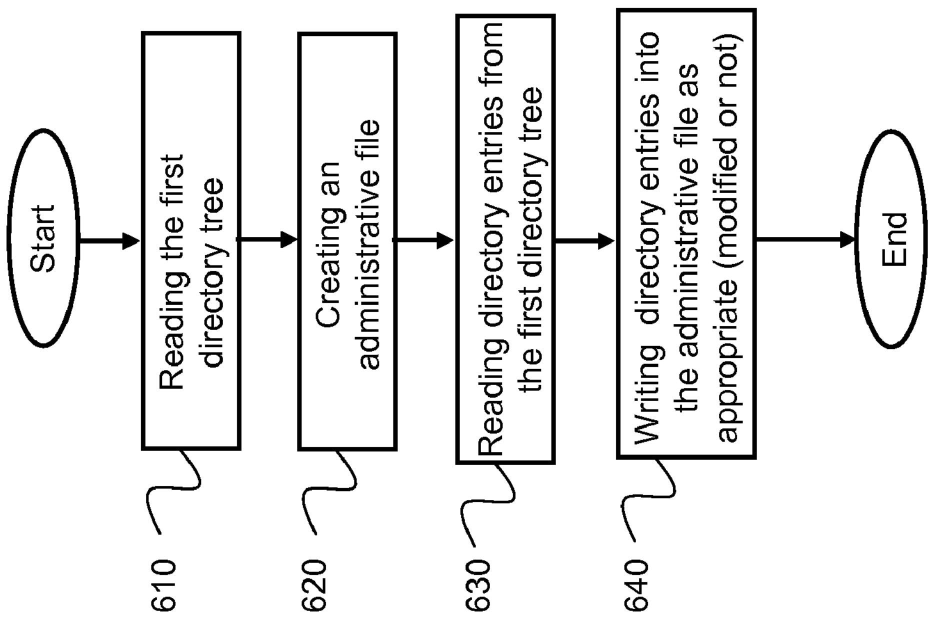
FIG. 6 is a method for creating the second directory tree from the first directory tree according to an example embodiment.

FIG. 6 shows a method for creating the second directory tree from the first directory tree according to an example embodiment. At step 610 the first directory tree is read from the storage device, for example by reading first the file system structure of the storage device. At step 620 an administrative file is created in the storage device in order to accommodate a second directory tree that will be used as an alternative directory tree in cases where hosts do not have the defined host capability.

At step 630 an entry is read from the first directory tree, which entry may include one or more directory elements, and at step 640 the entry read from the first directory tree is written into the administrative file either as an identical copy or as a modified copy, as appropriate; that is, if a data file referred to by the entry requires for consumption a host that has a defined host capability, the entry corresponding to that data file is written into the administrative file as an altered or modified entry, but if, however, the data file referred to by the entry does not require for consumption a host that has the defined host capability, the read entry (i.e., the entry's directory elements) is written into the administrative file as is (i.e., unmodified/unaltered). By "modified entry" and "altered entry" is respectively meant an entry of a second directory tree that includes one or more directory element that has been modified or altered relative to corresponding one or more directory elements in the original directory tree that correspond to that data file.

Figure 7:
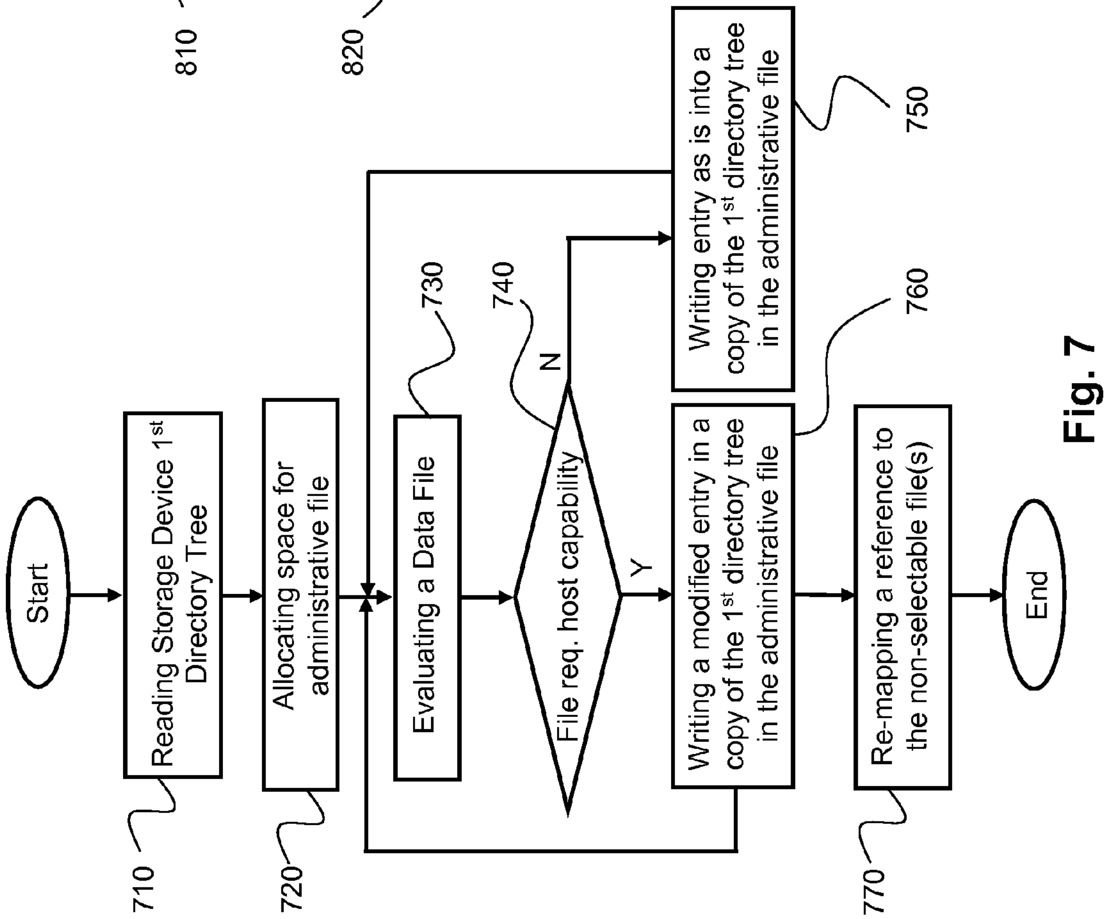
FIG. 7 is a method for creating for a storage device the second directory tree from the first directory tree according to another example embodiment.

FIG. 7 shows a method for creating the second directory tree from the first directory tree according to another example embodiment, and more specifically FIG. 7 shows an iterative process by which data files are examined or evaluated one file after another, and an administrative file is created and thereafter iteratively updated with file-related entries and modified entries as the data files are evaluated or examined one file after the other. At step 710 the file system structure of the storage device is read and a first (i.e., the original, or native) directory tree is retrieved therefrom. At step 720 an administrative file is created in a storage space allocated for it within the storage device's file system for accommodating a second directory tree for the storage device.

At step 730 a data file in the storage device is evaluated or examined to determine whether the data file requires for consumption (e.g., for play back) a host that has a defined host capability. If the data file does not require for consumption a host that has a defined host capability (shown as "N" at step 740), then at step 750 an entry from the first directory tree that corresponds to the data file is written as is (i.e., it is copied) into a second directory tree that is accommodated by the administrative file. After the entry corresponding to the currently handled data file is copied into the administrative file the next data file is evaluated or examined likewise.

If the currently evaluated or examined data file requires for consumption a host that has the defined host capability (shown as "Y" at step 740), then at step 760 a modified version of the entry (herein referred to as the "modified entry") from the first directory tree corresponding to the data file is written into the administrative file, such that modified entry the data file is not made or rendered selectable for consumption by hosts that do not have the defined host capability. After the modified entry corresponding to the currently handled data file is written into the administrative file the next data file is evaluated or examined likewise.

In order to make a data file non-selectable the data file may be marked in the administrative file as "hidden". Hiding the data file in the administrative file may be effected by altering a file attribute of the data file, for example, by renaming the data file.

Storing a modified version of an entry in the second directory tree may be implemented by: (i) reading the entry from the first directory tree (ii) writing the read entry into the second directory tree and (iii) altering, in the second directory tree, one or more directory elements of the entry. Alternatively, the entry can be read from the first directory tree and, then, one or more directory elements of the entry may be modified or altered and, thereafter, written into the second directory tree as modified or altered elements.

If, after having all the relevant (e.g., playable) data files in the storage device evaluated or examined, at least one of the data files stored in the storage device requires for consumption a host that has the defined host capability; that is, if at least one data file cannot be consumed (e.g., played back) by a host that does not have the defined host capability, then at step 770 a reference to the alternative directory tree (i.e., a reference to the second directory tree that was created in the administrative file), in which the at least one data file is not selectable, is remapped in order for the second directory tree to prevail if the storage device is operatively connected to a host that does not have the defined host capability.

Figure 8:
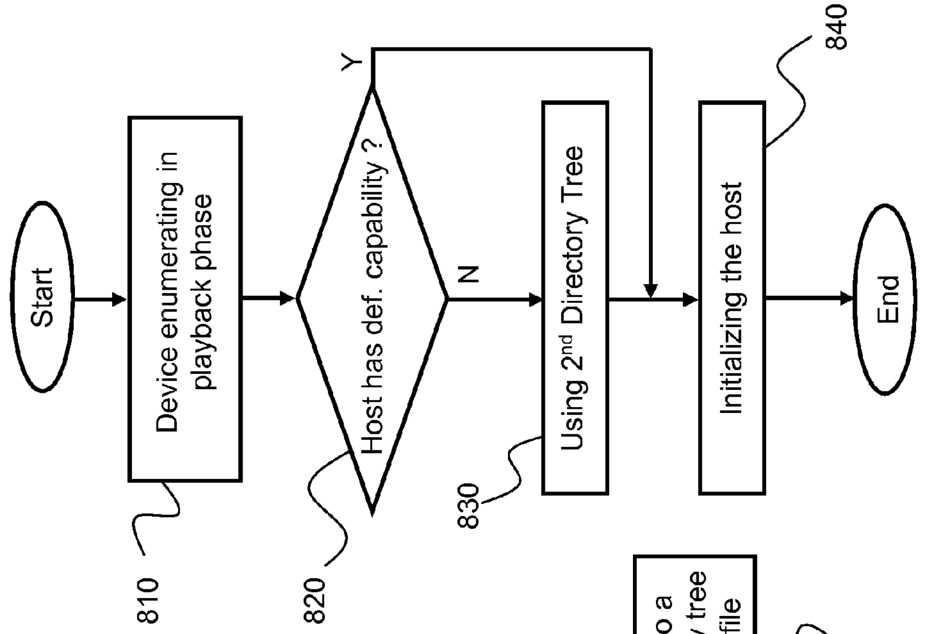
FIG. 8 is a method for presenting content of a storage device to a host according to an example embodiment.

FIG. 8 shows a method for presenting content of a storage device to a host. At step 810 a storage device is operatively interfaced with a host in order to consume (e.g., play back) a data file that is stored in the storage device. In this step during a handshake between the host and the storage device the two parties exchange information regarding each other's capabilities. Based on information that is received from the host during the handshake phase the storage device determines, at step 820, whether the host has a defined host capability which, in this example, is the host having a high-speed connection or the host being capable of handling high-speed data files.

The storage device may determine whether the host has the defined capability by examining parameters that are exchanged during the handshake between the host and the storage device, or examining data that are received from signaling interface 290 (FIG. 2) operatively connected to the storage device. Signaling interface 290 may be, for example, a push button.

If the host does not have the defined host capability (shown as "N" at step 820), this means that the host is a low-end host and, therefore, it should be permitted to consume only data files that were meant to be consumed by low-end hosts. Therefore, at step 830 the storage device has to initialize the host with a reference to the second (i.e., alternative) directory tree that, as explained above, presents to the host (and to the end-user) data files that are suitable for consumption by the low-end host and "hides" from the host (and from the end-user) data files that are unsuitable for consumption by the low-end host. A data file that is unsuitable for consumption by a low-end host is a data file that can be consumed only by a high-speed host. Using the second directory tree includes accessing an administrative file in the storage device, the administrative file containing at least one entry from the first directory tree that corresponds to the data file and that has been altered. At step 840 the storage device initializes the host with a reference to the second directory tree in order to enable the host to access files that are accessible through the second directory tree.

If, however, the host has the defined host capability (shown as "Y" at step 820), this means that the host is capable of consuming (e.g., playing back) both types of data files (i.e., data files that require the defined host capability and data files that do not require the defined host capability) without compromising consumption quality and, therefore, the host should be permitted to consume every data file that is stored in the storage device, by presenting to the host a file system that includes these data files. Therefore, at step 840 the storage device initializes the host with a reference to the first directory tree in order to enable the host to access every data file that is accessible through the first (i.e., original) directory tree.

FIG. 9 is a directory table 900 showing two example "native" or original (i.e., unmodified) directory entries 910 (corresponding to a file called "MYMOVIE") and 920 (corresponding to a file called "LOWRES") in a file system of a storage device. Briefly, a "directory table" is a special type of file that represents a directory (also known as a folder). Each file or directory stored within the directory table is represented by a 32-byte entry. Each entry in directory table 900 may include, or have associated with it, a set of data such as the file's, or directory's, name, extension, attributes (archive, directory, hidden, read-only, system and volume), the date and time of creation of the file, the address of the first cluster of the file/directory's data and the size of the file/directory.

It is noted that all the numbers in directory table 900 (i.e., except the number of bytes) are hexadecimal numbers. Directory table 900 includes the following exemplary fields or, as they are referred to herein, "directory elements": (1) "File name" (8 bytes), (2) The file extension (i.e., "Extension", 3 bytes), (3) "Attributes" (1 byte), (4) "Reserved" (1 byte), (5) "Create Date/Time" (5 bytes), (6) "Last access date" (2 bytes), (7) "First cluster" (high word, 2 bytes), (8) "Last modified Date/Time" (4 bytes), (9) "First cluster" (low word, 2 bytes), and (10) file size (i.e., "Size", 4 bytes). This entry structure is valid specifically for FAT32 as implemented in Windows XP and Vista. Other file systems, though, use a slightly different structure. For example, FAT16 uses a structure that does not include the high word of the first cluster number, and the legacy DOS structure (which is used by some DVD players) has a reserved block of 10 bytes instead of 1 byte, followed by the low word of the first cluster number.

FIGS. 10A through 10D show modifications of directory entries of directory table 900 of FIG. 9, which have been made in order to render the data file in question non-selectable for consumption by a host. It is noted that some of the fields of directory table 900 of FIG. 9 (e.g., the "Reserved" field and timestamp fields of directory table 900) are not relevant or affected, so they have been omitted in the modifications illustrated in FIGS. 10A through 10D.

Referring to FIG. 10A a data file called "MYMOVIE" is made non-selectable for consumption by hiding the data file (i.e., "MYMOVIE") in an alternative (i.e., second) directory tree. In order to hide the "MYMOVIE" data file in the second directory tree a "hidden attribute value" (i.e., "02", in this example) is "OR"ed with the value 930 (i.e., 20 in this example, see FIG. 9) in the attribute field in the directory entry, "OR" being a logical operation between two binary operands. The operating system of the host uses the resulting value 22 (the directory element being shown at 1030 in FIG. 10A) as an indication that the file should not be displayed for selection.

Referring to FIG. 10B the data file "MYMOVIE" is made non-selectable for consumption by altering a directory element which, in this example, is the first cluster address/size of the data file "MYMOVIE", in a corresponding entry in the alternative (i.e., second) directory tree. In this type of modification the starting cluster and size are modified to indicate a different data file. In this example data file "MYMOVIE.AVI" is made non-selectable for consumption by posing it as the "LOWRES.AVI" data file. This is done by swapping the first cluster address (i.e., "04001544", shown at 940 in FIG. 9) of data file "MYMOVIE.AVI" with the first cluster address (i.e., "00009410", shown at 950 in FIG. 9) of data file "LOWRES.AVI", and the file size (i.e., "14DC9380", shown at 960 in FIG. 9) of data file "MYMOVIE.AVI" with the file size (i.e., "0A6E49C0", shown at 970 in FIG. 9) of data file "LOWRES.AVI". The first cluster address and file size of the two data files (i.e., data files "MYMOVIE.AVI" and "LOWRES.AVI") are shown swapped in FIG. 10B (i.e., at 1040). In this way, when a user selects data file "MYMOVIE.AVI" the contents of the hidden file "LOWRES.AVI" are presented instead; it is thus not possible for the user to retrieve the file "MYMOVIE.AVI". This swapping of information and blocking of the file "MYMOVIE.AVI" avoids a situation where a file system repair software (such as fsck or chkdsk) attempts to release the clusters that are assigned to the file in the FAT, which, otherwise, would damage the original file system presented by the first directory tree. Referring to FIG. 10C the data file (i.e., "MYMOVIE" is made non-selectable for consumption by altering a directory element, here the name of the data file (i.e., "MYMOVIE") in the alternative (i.e., second) directory tree ("MYMOVIE" has been changed to "<E5>DONTUSE", shown at 1060 in FIG. 10C, where "E5" indicates a deleted file) to prevent the file from being used.

However, the original first cluster 1070 allocated to the "MYMOVIE" data file in the FAT and the original file size 1075 are still in use (i.e., neither of them has been modified or deleted) so that the "MYMOVIE" data file can be "recovered" and reused by merely reinstating the data file's name. This modification should not be used if the file system can be written into when the second directory tree is used, because the directory entry can be reused and the FAT chains can be "recovered" for use in other files if a file system repair application is used. Typically, the second host (i.e., the host using the second directory tree or the "low-speed" host) cannot write to the storage device. Referring to FIG. 10D the data file "MYMOVIE" is made non-selectable for consumption by changing a directory element which, in this example, is the file extension of the data file, from "AVI" to "NOP" (shown at 1080 in FIG. 10D). "NOP" is not a valid extension for video files. Therefore, hosts filtering data files by file extension will not "see" this file.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules. The present disclosure is relevant to various types of mass storage devices such as SD-driven flash memory cards, flash storage device, non-flash storage devices, and so on, and to various host capabilities. Hence the scope of the claims that follow is not limited by the disclosure herein.

What is claimed is:

1. A method of presenting a view of a file system of a storage device to a host, the method comprising:
- determining, by a storage device, whether a host has a defined capability;
- in response to the host having the defined capability:
  - accessing a first directory tree file stored at the storage device to present a view of a file system of the storage device to the host, wherein the first directory tree file identifies multiple files stored at the storage device; and
  - providing the first directory tree file to the host; and
- in response to the host not having the defined capability:
  - accessing a second directory tree file stored at the storage device, wherein the second directory tree file identifies a subset of files of the multiple files, wherein the subset of files includes a first data file of the multiple files that does not require the defined capability and the second directory tree file makes the first data file selectable for consumption by the host, wherein the subset of files does not include a second data file of the multiple files, the second data file requiring the defined capability, and wherein the second directory tree file does not make the second data file selectable for consumption by the host; and
  - providing the second directory tree file to the host.

2. The method of claim 1, wherein the second directory tree file is a modified copy of the first directory tree file, wherein an entry from the first directory tree file has been altered in the second directory tree file, the entry corresponding to the second data file.

3. The method of claim 1, wherein the second directory tree file is an administrative file in the storage device.

4. The method of claim 1, wherein the second data file is rendered non-selectable for consumption by the host by the second file being designated as hidden in the second directory tree file.

5. The method of claim 4, wherein the second data file is designated as hidden by a file attribute of the second data file in the second directory tree file, wherein the file attribute is altered relative to a corresponding file attribute of the second data file in the first directory tree file.

6. The method of claim 1, wherein determining whether the host has the defined capability includes examination of parameters exchanged during a handshake between the host and the storage device.

7. The method of claim 1, wherein determining whether the host has the defined capability includes examination of data received from a signaling interface operatively connected to the storage device.

8. The method of claim 7, wherein the signaling interface is a push button.

9. The method of claim 1, wherein the defined capability is a communication bandwidth.

10. The method of claim 1, wherein the storage device comprises a flash storage device that includes a Universal Serial Bus (USB) interface.

11. The method of claim 1, wherein the storage device comprises a Secure Digital (SD) card.

12. The method of claim 1, wherein the second directory tree file is created by:
- defining a host capability to generate the defined capability;

accessing an entry of the first director tree file, the entry corresponding to particular data file that is stored at the storage device;

determining whether the particular data file requires the defined capability;

when the particular data file requires the defined capability, creating an entry for the particular data file in the second directory tree file such that the particular data file is not selectable for consumption via the second directory tree file; and when the particular data file does not require the defined capability, creating an entry in the second directory tree file such that the particular data file is selectable for consumption via the second directory tree file.

13. The method of claim 1, wherein the second data file is rendered non-selectable for consumption by the host by a file name of the second file in the second directory tree file being altered relative to a file name of the second file in the first directory file tree.

14. The method of claim 1, wherein the second data file is rendered non-selectable for consumption by the host by a file type of the second file indicated by the second directory tree file being altered relative to a file type of the second file indicated by the first directory file tree.

15. The method of claim 1, wherein the second data file is rendered non-selectable for consumption by the host by an address of the second file specified by the second directory tree file being altered relative to an address of the second file specified by the first directory file tree.

16. The method of claim 1, wherein the defined capability is an ability to use a particular file format.

17. The method of claim 1, wherein the defined capability is an ability to playback data files at a specified bit rate.

18. The method of claim 1, wherein the defined capability is supporting a Universal Serial Bus (USB) high-speed connection.

19. The method of claim 1, wherein the defined capability is an ability to playback particular data files, wherein the first data file requires a first playback quality level and the second data file requires a second playback quality level.

20. A storage device comprising:

a non-volatile memory including a file system stored in the non-volatile memory; and a controller coupled to the non-volatile memory and configured to determine whether a host has a defined capability;

wherein in response to the host having the defined capability, the controller is configured to:

access a first directory tree file stored at the storage device to present a view of the file system of the storage device to the host, wherein the first directory tree file identifies files stored at the storage device; and provide the first directory tree file to the host; and wherein in response to the host not having the defined capability, the controller is configured to:

access a second directory tree file stored at the storage device, wherein the second directory tree file identifies a subset of the files stored at the storage device, wherein the subset includes, a first data file that does not require the defined capability and the second directory tree file makes the first data file selectable for consumption by the host, wherein the subset does not include a second data file, the second data file requiring the defined capability, and wherein the second directory tree file does not make the second data file selectable for consumption via the host; and provide the second directory tree file to the host.

21. The storage device of claim 20, wherein the controller is further configured to render the second data file non-selectable for consumption by the host by storing in the second directory tree file a specific address of a first memory cluster of the second data file that is different than a corresponding address of the second data file in the first directory tree file.

* * * * *

UNITED STATES PATENT AND TRADEMARK OFFICE

CERTIFICATE OF CORRECTION

PATENT NO. : 8,239,395 B2
APPLICATION NO. : 12/344373
DATED : August 7, 2012
INVENTOR(S) : Ari Daniel Fruchter et al.

It is certified that error appears in the above-identified patent and that said Letters Patent is hereby corrected as shown below:

In the Claims

Column 17, Claim 12, Line 1, "accessing an entry of the first director tree file, the entry" should read --accessing an entry of the first directory tree file, the entry--.

Column 17, Claim 12, Line 2, "corresponding to particular data file that is stored at the" should read --corresponding to a particular data file that is stored at the--.

Column 18, Claim 20, Line 29, "file selectable for consumption via the host; and" should read --file selectable for consumption by the host; and--.

Signed and Sealed this
Thirteenth Day of January, 2015

Michelle K. Lee
*Deputy Director of the United States Patent and Trademark Office*